(12) United States Patent
Pinto et al.

(10) Patent No.: US 8,181,155 B2
(45) Date of Patent: May 15, 2012

(54) UNIFIED EXPRESSION AND LOCATION FRAMEWORK

(75) Inventors: Edmund Samuel Victor Pinto, Duvall, WA (US); Kenneth David Wolf, Seattle, WA (US); Robert Brian Schmidt, Woodinville, WA (US); Nathan C. Talbert, Seattle, WA (US); Geoffrey M. Kizer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1102 days.

(21) Appl. No.: 12/040,567

(22) Filed: Feb. 29, 2008

(65) Prior Publication Data

US 2009/0222794 A1 Sep. 3, 2009

(51) Int. Cl.
*G06F 9/44* (2006.01)
*G06F 9/45* (2006.01)

(52) U.S. Cl. .................... 717/116; 717/108; 717/151

(58) Field of Classification Search .................. None
See application file for complete search history.

(56) References Cited

U.S. PATENT DOCUMENTS

| | | | |
|---|---|---|---|
| 5,742,806 A | | 4/1998 | Reiner et al. |
| 5,822,585 A | * | 10/1998 | Noble et al. .............. 719/316 |
| 5,956,512 A | * | 9/1999 | Simmons et al. ........... 717/128 |
| 5,970,498 A | * | 10/1999 | Duffield et al. ................... 1/1 |
| 6,014,666 A | | 1/2000 | Helland et al. |
| 6,067,413 A | | 5/2000 | Gustafsson et al. |
| 6,163,774 A | * | 12/2000 | Lore et al. ................. 705/36 R |
| 6,182,277 B1 | | 1/2001 | DeGroot et al. |
| 6,542,891 B1 | | 4/2003 | Loen et al. |
| 6,553,268 B1 | * | 4/2003 | Schwenke et al. ............. 700/18 |
| 6,678,696 B1 | | 1/2004 | Helland |
| 6,718,535 B1 | | 4/2004 | Underwood |
| 6,738,968 B1 | | 5/2004 | Bosworth et al. |
| 6,757,887 B1 | | 6/2004 | Kaplan |
| 6,901,578 B1 | | 5/2005 | Beaven |
| 7,043,722 B2 | | 5/2006 | Bau, III |
| 7,150,010 B1 | | 12/2006 | Ringseth et al. |
| 7,203,866 B2 | * | 4/2007 | Di Fabbrizio et al. ..... 714/38.12 |
| 7,225,425 B2 | | 5/2007 | Kompalli et al. |
| 7,254,809 B2 | | 8/2007 | Kurhekar et al. |
| 7,356,767 B2 | * | 4/2008 | Dahyabhai et al. ........... 715/209 |
| 7,398,525 B2 | | 7/2008 | Leymann |
| 7,451,392 B1 | | 11/2008 | Chalecki |
| 7,496,887 B2 | | 2/2009 | Grasselt |
| 7,606,824 B2 | | 10/2009 | Sanabria |

(Continued)

OTHER PUBLICATIONS

Chung et al., Expression Language Specification Version 2.1, published by Sun Microsystems, Inc., Final Release—May 8, 2006, pp. 1-108.*

(Continued)

*Primary Examiner* — Tuan Dam
*Assistant Examiner* — Zheng Wei
(74) *Attorney, Agent, or Firm* — Workman Nydegger

(57) ABSTRACT

Allowing a continuation based runtime to resolve different types of location expressions, value expressions, and/or locations. This may be accomplished using a different class for each particular type. The location expression classes may each have a common method used for all of the location expression classes. The value expression classes may each have a common method, and the locations may also each have a common method. This allows the resolution of such location and value expressions to be treated in a unified fashion regardless of the type of location expression, or the type of value expression. Also, the location may be treated in a unified manner regardless of the type of location.

16 Claims, 5 Drawing Sheets

U.S. PATENT DOCUMENTS

| | | | | |
|---|---|---|---|---|
| 7,607,123 | B2* | 10/2009 | Chavan | 717/129 |
| 7,734,958 | B1* | 6/2010 | Di Fabbrizio et al. | 714/38.14 |
| 7,761,586 | B2* | 7/2010 | Olenick et al. | 709/230 |
| 7,774,699 | B2* | 8/2010 | Lin | 715/236 |
| 7,813,741 | B2* | 10/2010 | Hendrey et al. | 455/456.1 |
| 7,827,127 | B2* | 11/2010 | Wolf et al. | 706/14 |
| 7,836,428 | B2 | 11/2010 | Mitchell | |
| 7,966,605 | B1* | 6/2011 | Di Fabbrizio et al. | 717/127 |
| 8,019,770 | B1* | 9/2011 | Hartsook et al. | 707/759 |
| 2003/0105654 | A1 | 6/2003 | MacLeod | |
| 2004/0044987 | A1 | 3/2004 | Kompalli | |
| 2005/0050069 | A1 | 3/2005 | Vaschillo | |
| 2005/0097514 | A1* | 5/2005 | Nuss | 717/114 |
| 2005/0114771 | A1* | 5/2005 | Piehler et al. | 715/536 |
| 2006/0041872 | A1 | 2/2006 | Poznanovic et al. | |
| 2006/0064574 | A1 | 3/2006 | Rolfs | |
| 2006/0074704 | A1 | 4/2006 | Shukla et al. | |
| 2006/0074730 | A1 | 4/2006 | Shukla et al. | |
| 2006/0074732 | A1 | 4/2006 | Shukla et al. | |
| 2006/0074737 | A1* | 4/2006 | Shukla et al. | 705/8 |
| 2006/0242173 | A1 | 10/2006 | Tsyganskiy | |
| 2006/0248519 | A1* | 11/2006 | Jaeger et al. | 717/141 |
| 2007/0033659 | A1 | 2/2007 | Hoche et al. | |
| 2007/0044144 | A1* | 2/2007 | Knouse et al. | 726/8 |
| 2007/0061799 | A1 | 3/2007 | Kimmerly | |
| 2007/0083813 | A1 | 4/2007 | Lui et al. | |
| 2007/0168327 | A1* | 7/2007 | Lindblad et al. | 707/2 |
| 2007/0233969 | A1 | 10/2007 | Shukla et al. | |
| 2007/0239498 | A1 | 10/2007 | Shukula et al. | |
| 2007/0239499 | A1 | 10/2007 | Shukla et al. | |
| 2007/0239505 | A1 | 10/2007 | Shukla et al. | |
| 2007/0288223 | A1 | 12/2007 | Werkmann | |
| 2007/0300185 | A1 | 12/2007 | Macbeth | |
| 2008/0120594 | A1 | 5/2008 | Lucas | |
| 2008/0140645 | A1* | 6/2008 | Denoual | 707/5 |
| 2008/0216094 | A1* | 9/2008 | Anderson et al. | 719/318 |
| 2008/0320031 | A1* | 12/2008 | Denoual | 707/102 |
| 2009/0112779 | A1* | 4/2009 | Wolf et al. | 706/14 |
| 2009/0150854 | A1 | 6/2009 | Elaasar | |
| 2009/0222827 | A1 | 9/2009 | Pinto | |
| 2009/0259514 | A1* | 10/2009 | Kumar et al. | 705/9 |
| 2010/0169862 | A1* | 7/2010 | Wolf et al. | 717/117 |

OTHER PUBLICATIONS

Lubke et al., Unified Expression Language, published by Sun Microsystems, Inc., Aug. 2005, pp. 1-9.*
"On Model Checking the Dynamics of Object-based Software", http://www.ctit.utwente.nl/library/phd/distefano.pdf, 332 pages.
"Specializing Continuations a Model for Dynamic Join Points", http://delivery.acm.org/10.1145-124000/1233840/p45-dutchyn. pdf?key1=1233840&key2=6134712911&coll=GUIDE&dl= GUIDE&CFID=38693618&CFTOKEN=41733587, 13 pages.
"Continuation Based Control in the Implementation of Parallel Logic Programs", http://www.cs.orgegon.edu/~conery/PDF/ConeryLA SC94.pdf.
Continuation Based Partial Evaluation (12 pages) http://www.diku. dk/~julia/lawall-danvy-Ifp94.ps.gz.
Continuation-based Partial Evaluation without Continuations. (21 pages) http://citeseer.ist.psu.edu/cache/papers/cs/27529/http:zSzz Szwww.informatik.uni-freiburg.deZSz~thiemannzSzpaperszSzcont wocont.pdf/thiemann03continuationbased.pdf.
Java Unified Expression Language (19 pages) http://juel. sourceforge.net/juel.pdf.
Office Action dated Sep. 27, 2011 cited in U.S. Appl. No. 12/060,794.

* cited by examiner

UNIFIED EXPRESSION AND LOCATION FRAMEWORK

BACKGROUND

One type of software is referred to as a "runtime". A runtime provides underlying functionality that can be used by multiple applications that run on a computing system. One distinct type of runtime is called a "continuation based runtime". A continuation based runtime executes activities. An activity represents a unit of executable code that consists of multiple pulses of work. For instance, suppose an activity is to receive messages. In that case, one pulse of work might be to set up the computing system with proper configuration and state to receive messages, and then pause until a message is received. Another pulse of work might occur when a message is received, which might involve setting up the message so that data can be extracted from the message. Another pulse of work might be to extract the data from the message itself, and so forth.

One of the ways an activity can execute multiple pulses of work is through the scheduling of child activities. This composition of activities enables custom control flows that can be implemented through the scheduling of child activities 0, 1 or n times as determined by the composite activity. Beyond this flexibility to create new control flows, activities in a continuation based runtime have a number of distinct characteristics. For instance, such activities have no process affinity in that they can be paused in one process, and resumed in a different process, and may also run on different threads. Such activities can also be persisted into persistent storage for later rehydration back into memory.

An expression is a combination of literals, symbols, operators, and possibly other expressions which evaluates to a value or a location in the context of an environment. In a continuation based runtime, expressions are used as properties on activities (e.g. the conditions on a while loop) as well as for binding activity parameters to an environment.

BRIEF SUMMARY

Embodiments described herein allow a continuation based runtime to resolve different types of location expressions, value expressions, and/or locations. In one embodiment, this is accomplished using a different class for each particular type. The location expression classes may each have a common method used for all of the location expression classes. The value expression classes may each have a common method, and the locations may also each have a common method. This allows the resolution of such location and value expressions to be treated in a unified fashion regardless of the type of location expression, or the type of value expression. Also, the location may be treated in a unified manner regardless of the type of location.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a continuation based runtime is permitted to resolve different types of location expressions, value expressions, and/or locations. In one embodiment, this is accomplished using a different class for each particular type. The location expression classes may each have a common method used for all of the location expression classes. The value expression classes may each have a common method, and the locations may also each have a common method. This allows the resolution of such location and value expressions to be treated in a unified fashion regardless of the type of location expression, or the type of value expression. Also, the location may be treated in a unified manner regardless of the type of location. First, some introductory discussion regarding message processors will be described with respect to FIG. 1. Then, various embodiments of a message dispatch engine will be described with respect to FIGS. 2 through 7.

Figure 1:
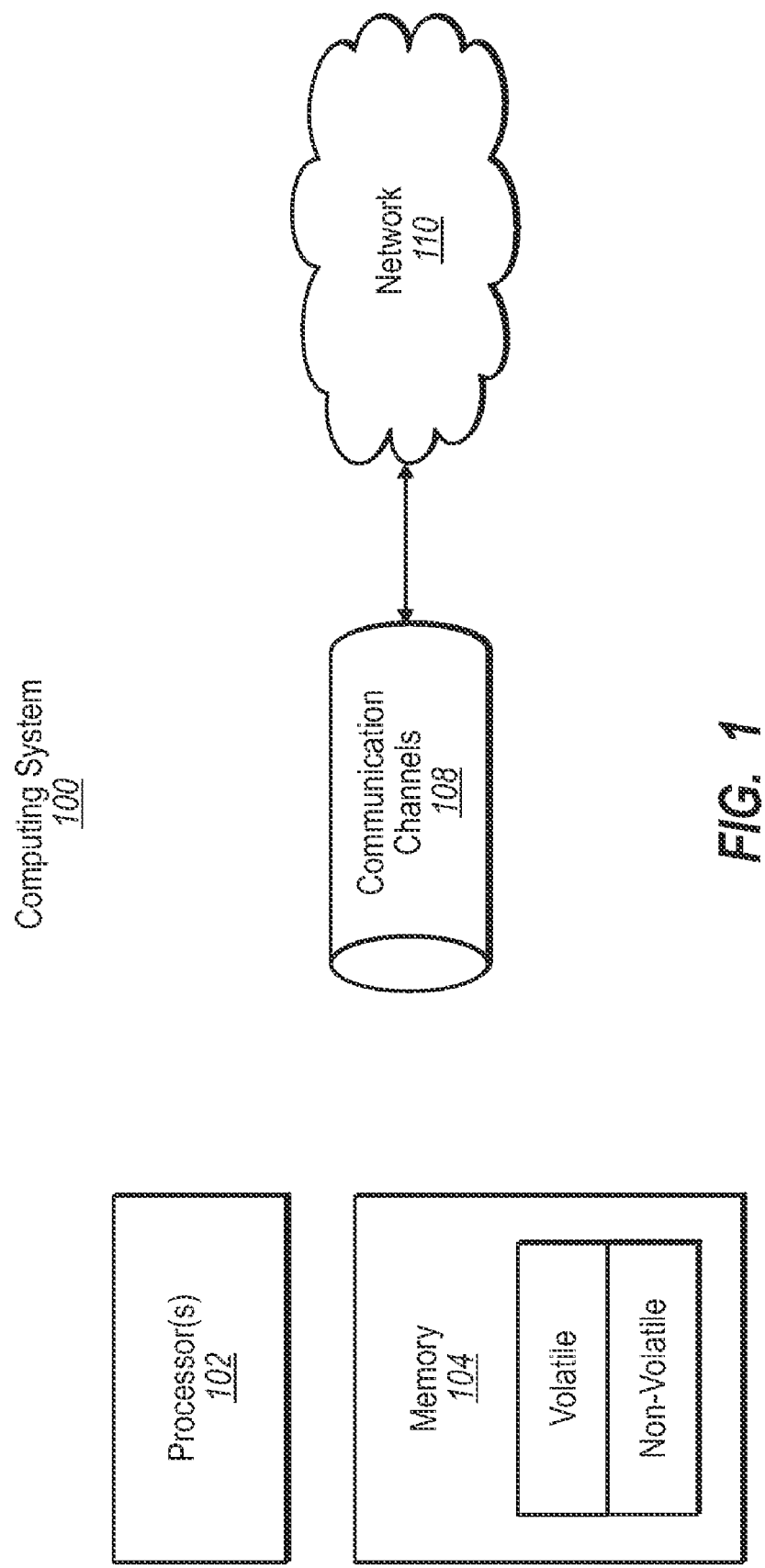
FIG. 1 illustrates an example computing system that may be used to employ embodiments described herein.

A message processor may be implemented in software or hardware, or a combination thereof FIG. 1 illustrates a computing system, which may implement a message processor in software. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems. That said, a "message processor" is not even limited to use in a computing system at all.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory"

may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 3:
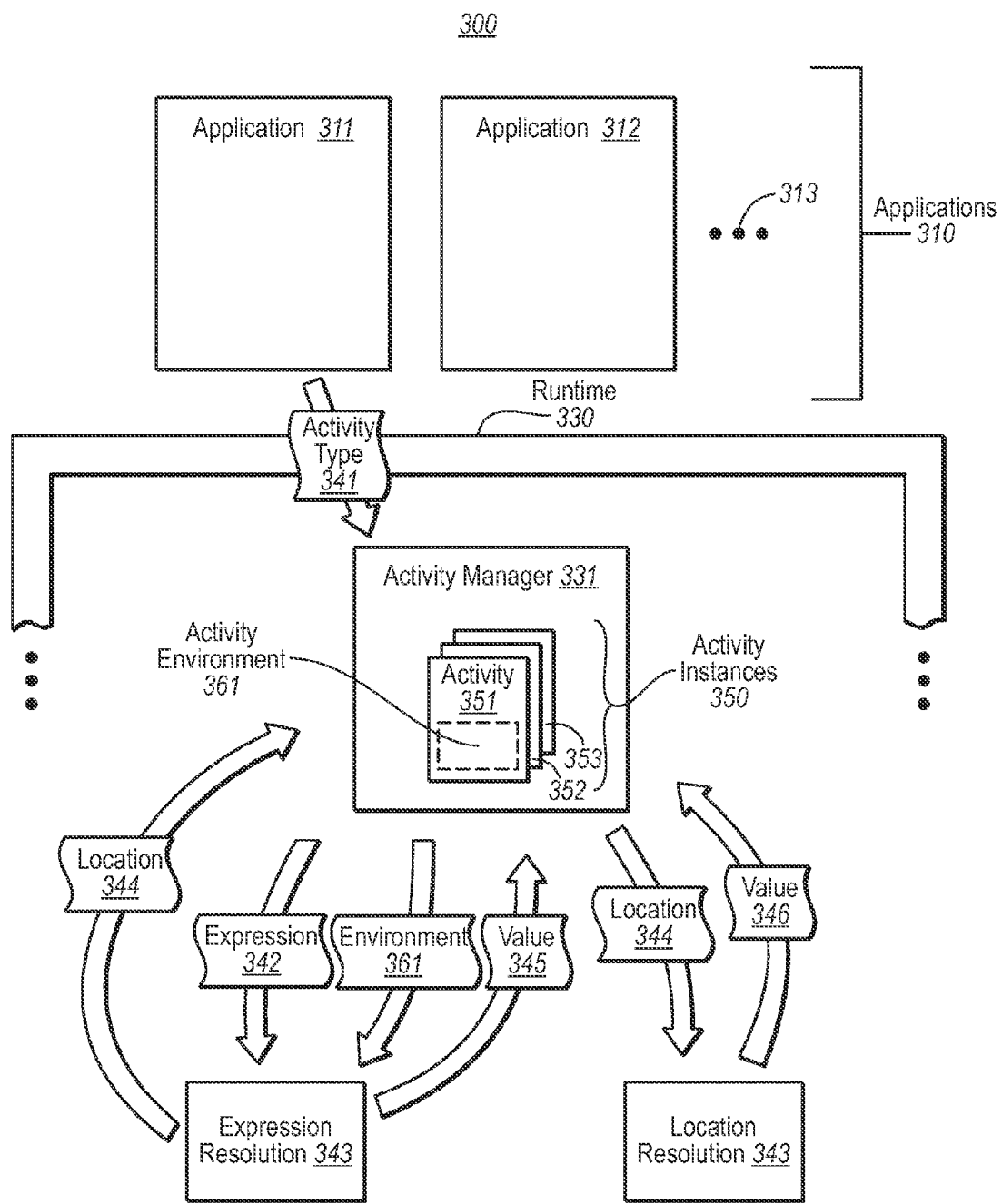
FIG. 3 schematically illustrates a software architecture and process flow associated with the resolution of location expressions, value expressions, and locations.

A runtime is software functionality that provides services to applications that run on a computing system. For instance, FIG. 3 illustrates a software architecture 300 for various components running on a computing system, such as the computing system 100 of FIG. 1. The software architecture 300 includes applications 310 that take advantage of the functionality provided by runtime 330. The applications 310 may include any number of applications. However, in the example of FIG. 3, the applications 310 are shown as including application 311, and application 312. However, the horizontal ellipses 313 symbolically represents that any number, one or more, of applications may be running and taking advantage of the services of the underlying runtime 330.

Figure 2:
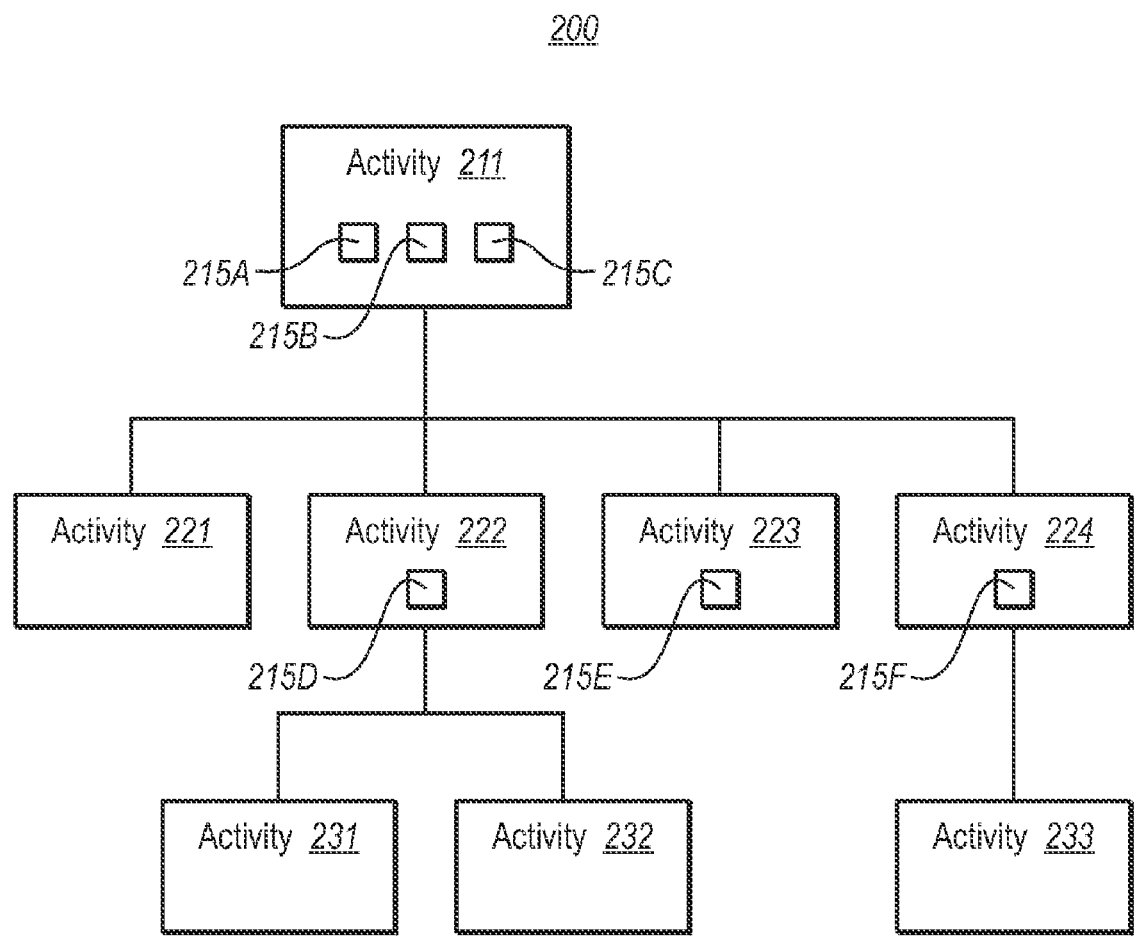
FIG. 2 schematically illustrates an example activity that is structured hierarchically with child activities, and with some activities including one or more expressions.

In one embodiment, the runtime 330 may be a continuation based runtime. A continuation based runtime performs pulses of work in the form of activities. Such activities are provided from one of the applications 310. For instance, application 311 is illustrated as providing activity 341 to the activity manager 331 of the runtime. Each activity may be hierarchically structured such that parent activities may include 0, 1 or more child activities of a given type. FIG. 2 schematically illustrates an example of such a hierarchically structured activity 200. The parent activity 211 includes child activities 221, 222, 223 and 224. The child activity 222 has its own child activities 231 and 232. The child activity 224 includes its own child activity 233. A parent activity is not completed until all of its child activities (or at least those child activities that are to be performed) are completed, and the parent activity otherwise completes its own work. Thus, in executing the parent activity 211, at least a subset of the various nodes of the tree 200 are navigated.

The activity manager 311 generates activity instances 350 from the information defined in activity 341 provided by the application 311. For example, in FIG. 3, there are three activity instances 351 through 353 that correspond to activity 341. The activity manager also associates an environment with each activity instance. For instance, an environment 361 is shown corresponding to the activity instance 351. An environment is a set of locations from which values can be extracted. An environment is associated with exactly one instance of an activity. If the activity type 341 has child activities, the activity manager 331 may also create one or more additional activity instances corresponding to those child activities, at least for the branches of the activity tree that are to be navigated.

Some of the activities include expressions. For instance, referring to FIG. 2, activity 211 is illustrated as including expressions 215A, 215B and 215C. Activity 222 is illustrated as including expression 215D. Activity 223 is illustrated as including expression 215E. Activity 224 is illustrated as including expression 215F. Expressions are evaluated in the context of an environment. Their terms dereference locations in an environment. Expressions on a particular activity resolve locations in environments for parent activities in the activity tree. Expressions may be used in an activity to describe a property of an activity. For instance, if the activity was a while loop, the expression may describe the condition for that while loop. In that case, the expression would be evaluated under each pulse of work resulting from the completion of one iteration of the loop to determine if the condition is still true. As with all behavior in a continuation-based runtime, the evaluation of this condition may be long-running and durably stored. Expressions may also be used to bind an activity parameter to the environment. Examples of this will be provided further below.

Figure 6:
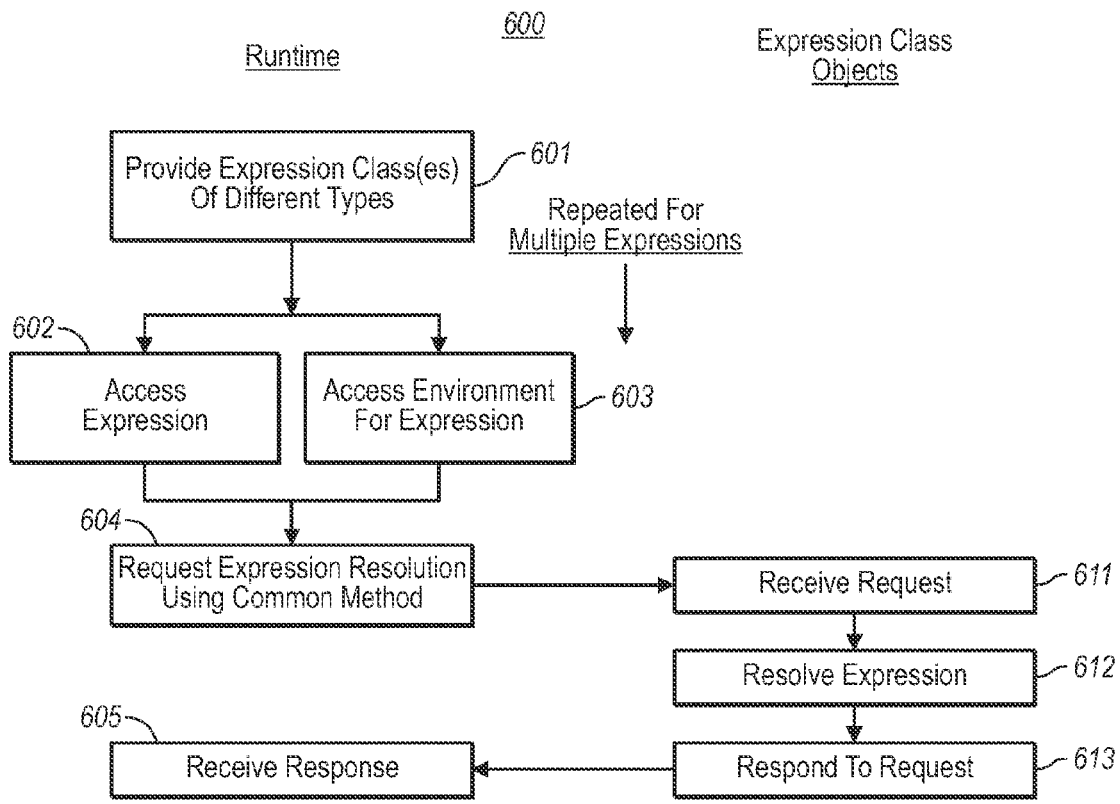
FIG. 6 illustrates a flowchart of a method for extracting a value or location from a value expression or a location expression.

FIG. 6 illustrates a flowchart of method 600 for allowing the continuation based runtime to resolve location or value expressions of multiple location or value expression classes. Some of the acts of the method 600 may be performed by a continuation based runtime, such as the runtime 330 of FIG. 3, and are illustrated in the left column of FIG. 6 centered under the heading "Runtime". Others of the acts of the method 600 may be performed by various object instances of location and value expression classes, such as the classes illustrated in the inheritance tree 400 of FIG. 4, and are illustrated in the right column of FIG. 6 centered under the heading "Expression Class Objects". Accordingly, the method 600 of FIG. 6 will be described with frequent reference to the software architecture 300 of FIG. 3, and the expression class inheritance tree 400 of FIG. 4.

In FIG. 6, the method 600 includes an act of providing multiple location and/or value expression classes (act 601). If location expression classes, each location expression class may be used to resolve a respective distinct category of location expressions into a location in a continuation based runtime. If value expression classes, each value expression class may be used to resolve a respective distinct category of value expressions into a value.

Figure 4:
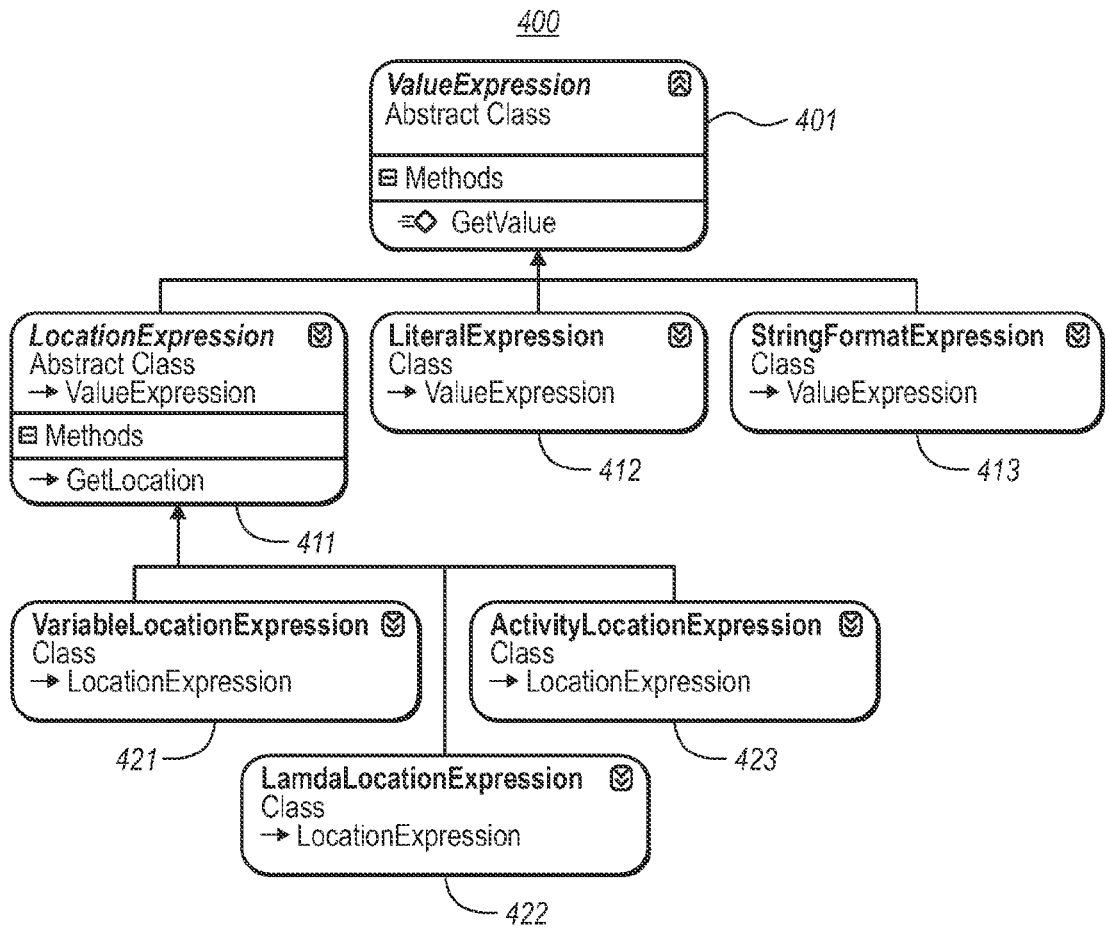
FIG. 4 illustrates an inheritance tree showing various location and value expression class that may be used to extract a location or value, respectively, from a location or value expression.
Figure 5:
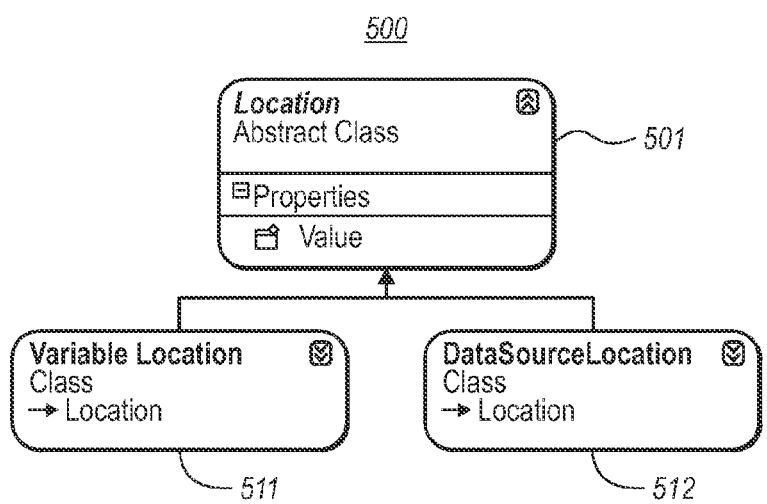
FIG. 5 illustrates an inheritance tree showing various location classes that may be used to extract a value from a location.

FIG. 4 illustrates an inheritance tree 400 illustrating various location and value expression classes. In particular, ValueExpression class 401 represents an abstract class that contains a method "GetValue". The ValueExpression class 401, in this implementation, serves as the root class for both location expression classes and value expression classes in the inheritance tree 400.

Each value expression class will use the environment of the expression (along with potentially other contextual information that represents the program state relative to the expression) to resolve an expression into an actual value. In contrast, each location expression class will use at least portions of the environment of the expression with potentially other contextual information to resolve an expression into a location, which points to a storage from which a value may be extracted. A corresponding location class may be used to resolve that returned location into an actual literal value.

LocationExpression class 411 is an abstract class that inherits properties from the ValueExpression class 411. However, LocationExpression class 411 contains a method "GetLocation" in addition to the method "GetValue". GetValue and GetLocation can be implemented synchronously or asynchronously as activities that get executed by the continuation based runtime as part of expression evaluation. Notably, basing expressions on activities yields several of the benefits of the continuation based runtime in the context of expressions. The LocationExpression class 411 serves as the root abstract class for all location expression classes in the inheritance tree. The various location expression classes of the inheritance tree 400 will first be described, followed by the various value expression classes.

The various child location expression classes 421, 422 and 423 each inherit the GetLocation method from the LocationExpression class 411, and also inherit all properties in its ancestral chain in the inheritance tree 400. A VariableLocationExpression is initialized with a variable. The GetLocation method of the VariableLocationExpression class 421 receives as an input parameter an environment, and contains all logic necessary to resolve that variable into a location. A LambdaLocationExpression is initialized with a LambdaExpression. The GetLocation method of the LamdaLocationExpression class 422 receives as an input an environment and evaluates the LambdaExpression into a location. An actual example of such expressions will be described further below. Note that all of the location expression classes have a common method "GetLocation" (which can be implemented synchronously or asynchronously in a continuation-based fashion). This allows for a relatively unified interface when requesting that the location expression class resolve a location expression, regardless of the type of location expression being resolved.

LocationExpression represents the concept of lvalues in the continuation based runtime. These are expressions that yield a location in the context of an environment. They are legal both as the source or target of an assignment activity. When used as an rvalue, location expressions yield a value. As lvalues, a location expression yields a location.

The various child value expression classes 412 and 413 each inherit the GetValue method from the ValueExpression class 401, and also inherit all properties in its ancestral chain in the inheritance tree 400. A LiteralExpression is initialized with a literal value. The GetValue method of the LiteralValueExpression class 421 receives as an input parameter an environment, and returns the pre-configured literal as its value. The StringFormatExpression is initialized with a format string and additional sub-expressions that represent the values to use in the format string. The GetValue method of the StringFormatExpression class 422 receives as an input parameter an environment and resolves that into a value. Actual examples of such expressions will also be described further below. Note that all of the value expression classes have a common method "GetValue" (which can be implemented synchronously or asynchronously in a continuation-based fashion). This allows for a relatively unified interface when requesting that the value expression class resolve a value expression, regardless of the type of value expression being resolved. LiteralExpression represents a literal rvalue in a continuation based runtime. StringFormatExpression is a custom expression representing a tokenized format string that can be evaluated against an environment to yield a formatted string.

Referring to FIG. 6, the method 600 then includes an act of accessing a location or value expression of a particular type (act 602). Referring to FIG. 3, for example, the activity manager 331 schedules activity 341. The expression may be accessed from the activity 341 provided by the application 310. Since expressions are used to bind activity parameters to the environment, the activity manager 331 needs to resolve location expressions into locations, and resolve value expressions into values. The activity manager 331 does this by evaluating the expressions on the activity parameters in the context of the activity's environment. Accordingly, the environment of the expression is also accessed (act 603).

A particular example of an activity will now be set forth as follows with line numbering added for clarity and for purposes of subsequent reference:

```
1.   <ActivityDescription Name="Prompt">
2.     <ActivityDescription.Properties>
3.       <Parameter Name="Message" Type="s:String"
           Direction="In" />
4.       <Parameter Name="Result" Type="s:String"
           Direction="Out" />
5.     </ActivityDescription.Properties>
6.     <ActivityDescription.Body>
7.       <Sequence>
8.         <Sequence.Variables>
9.           <Variable Name="Response" Type="s:String" />
10.        </Sequence.Variables>
11.        <WriteLine Text="[Message]" />
12.        <ReadLine Result="[Response]" />
13.        <WriteLine Text="['The user entered: ' + Response]" />
14.        <Assign To="[Result]" Value="[Response]" />
15.      </Sequence>
16.    </ActivityDescription.Body>
17.  </ActivityDescription>
```

In this particular activity example, the activity is expressed declaratively using XAML formatting. Lines 1-17 represent the entire parent activity, which is called "Prompt" and contains a number of child activities. Lines 2-5 include the parameters of the activity. In particular, line 3 defines an activity input parameter called "Message" of type string. Line 4 defines an activity output parameter called "Result" also of type string.

Lines 6-16 define the actual body of the activity including local variable declarations, as well as a sequence of child activities to be performed. In lines 8-10, the local variables for the sequence are defined. In particular, line 9 defines a local variable called "Response", which is declared to be of type string. Together, the parameters and variables of an activity become the dereferenceable locations in the environment of the activity.

Lines 11-16 define a sequence of child activities to be performed. In particular, the first child activity in line 12 is a "WriteLine" activity, which receives as an input parameter "Text". "Text" is a WriteLine activity argument that is set equal to an expression called "[Message]". In the syntax presented in the example, expressions are bounded by square brackets "[" and "]". In this example, such expressions are used to bind parameter arguments (such as "Text") to the environment (e.g., to the parent activity parameters "Message" and "Result", and local variables "Response"). Accordingly, the expression should be resolved in order to perform the Writeline activity. Otherwise, the value of the input parameter "Text" for the WriteLine activity will not be known.

In the environment of FIG. 3, the activity manager 331 may be responsible for the overall execution of the Prompt activity example referred to in lines 1-17 of the example. However, upon encountering the [Message] expression, the activity manager 331 may enlist the services of the expression resolution module 343 to resolve the expression. Specifically, the activity manager 331 requests that the expression resolution module 343 resolve the expression 342 using the environment 361 of the expression as an input parameter (act 604). For instance, the activity manager 331 may use the GetValue or GetLocation methods to enlist the expression resolution module 343. The expression resolution module 343, which may abstractly represent the expression class tree of FIG. 4, may then use the appropriate expression class to resolve. The activity manager 331 need not even have know what type of expression class is being used since the activity manager 331 may use a common method regardless of which expression class is used to resolve the expression.

Returning to the XAML example, the [Message] expression will resolve to a value, which is whatever value was passed in with the input parameter "Message" of type string in the parent "Prompt" activity. Suppose, for example, that the string value of Message is "Please enter your age>". The activity manager 331 may know that this value is an input parameter to the "Prompt" argument, and that it is declared to be of type "string", which is a literal type. Accordingly, the expression resolution module 343 will use the LiteralExpression class 412 of FIG. 4 to resolve the expression.

The activity manager 331 also identifies from the expression one or more input parameters to provide to the object instance of the class (act 60). In this case, the input parameter is the string "Message" or some other identifier that the expression represents the input parameter to the "Prompt" activity, execution stood at line 11, when the activity manager passed the expression [Message] to the activity manager 331 for resolution. Upon receiving the string value "Please enter your age>" as a return, the activity manager 331 may bind that string value to the WriteLine activity's input parameter "Text". Thus, Text is equal to "Please enter your age>". The Writeline activity is thus called with this input, and the line "Please enter your age>" is written to the default output device (e.g., the display).

Referring to FIG. 6, once the proper expression class and expression environment are identified, a request is made to the object instance of the appropriate expression class (act 604). The appropriate environmental input parameters are provided to the object instance in that request. The request is placed using the common method for all of the value expression classes (which is "GetValue" in the example of FIG. 4). Referring to FIG. 3, for example, the activity manager 331 places a request to the expression resolution object 343 (e.g., an instance of the LiteralExpression class).

The object instance of the expression class receives the request (act 611), resolves the expression class (act 612), and returns the resolved value (act 613). Recall that this resolution may occur synchronously or asynchronously in a continuation based runtime. In some cases, it may be some time before the request is resolved, and the object instance of the expression class may even be persisted prior to resolution. In the case of the LiteralExpression class, the expression resolution module will extract the value of the input parameter "Message" passed into the "Prompt" activity. The appropriate expression value (e.g., the string "Please enter your age>") will then be returned back to the activity manager 331, whereupon it is received by the activity manager (act 605) for further execution of the activity.

The activity manager 331 then proceeds to the next child activity in the sequence in line 12. Here, we have a "ReadLine" activity, which also has an output parameter called "Result" which is set equal to a location expression "[Response]". Here, this is a location expression, which resolves to a location where a value is, rather than a value itself. In particular, the location that it resolves to is simply the variable "Response". In other words, the output parameter "Result" of the ReadLine activity is set equal to whatever value is stored at the location identified by the variable "Response".

The activity manager 331, upon encountering another expression, identifies the environment for the expression "[Response]". In this case, the expression resolution module may be an object instance of the VariableLocationExpression class 421, which resolves the expression (in the context of its environment) into a location "Response" which is then returned to the activity manager 331. For instance, the expression resolution object 343 passes the location 344 back to the activity manager 331. The activity manager 331 then performs the activity "ReadLine" using the Text location "Response", which basically causes a line of text to be read into the Response location. The line of text might come from a keyboard buffer, or other input device. Suppose for subsequent discussion that the user entered the string "35 Years Old" into the keyboard in response to the string "Please enter your age>" being written to the display.

Upon completion of the ReadLine activity in line 12 of the "Prompt" activity. The activity manager 331 then executes the WriteLine activity of line 13. Here, the input parameter Text is set equal to the expression ['The user entered:'+Response]", which is a string format expression in compound form. The StringFormatExpression class may thus be used to resolve the expression into the literal value "The user entered: 35 Years Old". The activity manager then writes this value to the display using the WriteLine activity of line 13 of the "Prompt" activity.

In line 14, the Assign activity assigns the resolved value of the expression [Response], which has been resolved to "35 Years Old", to the resolved location value of the expression "[Result]", which is the location of the output parameter for the entire "Prompt" activity. When the "Prompt" activity returns, it will return the value "35 Years Old" as its output parameter.

Accordingly, a flexible and unified expression resolution mechanism has been described in which location expressions of a variety of different types may be resolved using a common method, and in which value expressions of a variety of different types may be resolved using a common method.

Figure 7:
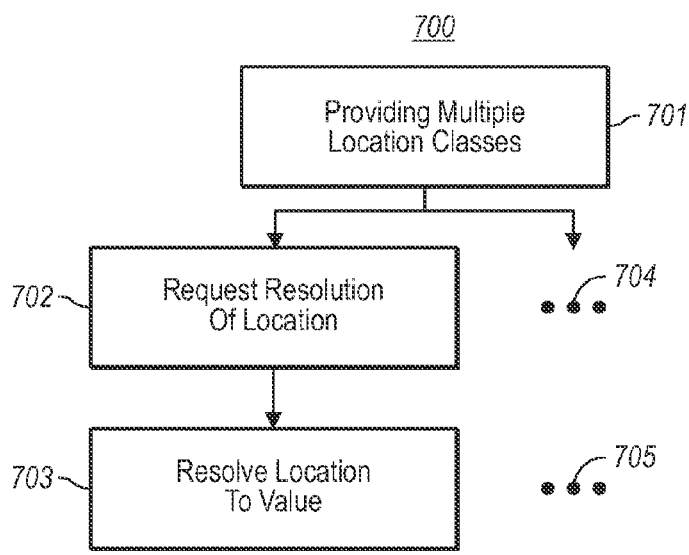
FIG. 7 illustrates a flowchart of a method for extracting a value from a location.

FIG. 7 illustrates a flowchart of a method 700 for allowing the continuation based runtime to resolve multiple location classes. Location classes are different than location expression classes. Location classes are proxies for accessing an underlying data in a continuation based runtime. The method 700 first includes an act of providing such location classes (act 701). For instance, referring to FIG. 5, an inheritance tree 500 is shown including a parent Location abstract class 501, and including several child classes including a VariableLocation class 511, and a DataSourceLocation class 512. For example, a VariableLocation can be resolved in the environment as a symbol behind which the runtime provides variable storage. Alternatively, DataSourceLocation is a custom location that can be resolved in the environment as a symbol behind which the implementer provides value storage in a database.

Returning back to FIG. 7, a request may be made to an object of a location class (act 702), by returning the actual value stored at that location (act 703). For example, referring to FIG. 3, the location 344 is provided to the location resolution object 336 which response with the value 346. This may be repeated for various locations, where different location classes are used as appropriate. The resolution for multiple locations may occur in parallel as represented by the horizontal ellipses 704 and 705. For instance, one of the following may be different according to the location class, the mechanism used to access the data at the location, the manner in which the data is stored at the location, and the environment in which the data is stored.

Accordingly, the embodiments described herein present an effective mechanism for resolving expressions and locations in a unified manner. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one of more computer-readable storage devices having stored thereon computer-executable instructions that, when executed by a computing system capable of running a continuation based runtime, causes the computing system to perform a method for allowing the continuation based runtime to resolve location expressions of multiple location expression classes, the method comprising:

an act of providing a first abstract base class that defines a method for resolving a value expression into a value, a second abstract class that derives from the first abstract base class and that defines a method for resolving a variable into a location, and multiple location expression classes that each derive from the second abstract class such that each of the multiple location expression classes inherits the method for resolving a value expression into a value defined in the first abstract base class and inherits the method for resolving a variable into a location from the second abstract class, such that each location expression class implements a common method for resolving a variable into a location, and is used to resolve a respective distinct category of location expressions into a location in a continuation based runtime;

an act of accessing a location expression of a particular type;

an act of identifying a location expression class of the multiple location expression classes that is used for resolving location expressions of the particular type;

an act of using the location expression to identify one or more input parameters representing an environment for the location expression to provide to an object instance of the identified location expression class;

an act of requesting a resolved location of the location expression using the common method of the object instance of the identified location expression class; and an act of receiving the resolved location of the location expression in response to the act of requesting.

2. The computer program product in accordance with claim 1, wherein the particular type of location expression comprises a variable location expression, wherein the multiple location expression classes include at least one other location expression class that is for location expression types that are not variable location expressions.

3. The computer program product in accordance with claim 1, wherein the particular type of location expression comprises a lambda location expression, wherein the multiple location expression classes include at least one other location expression class that is for location expression types that are not lambda location expressions.

4. The computer program product in accordance with claim 1, wherein the requested resolution occurs asynchronously in a continuation-based fashion.

5. The computer program product in accordance with claim 1, wherein the location expression is a first location expression of a first particular type, the location expression class is a first location expression class, the one or more input parameters are first one or more input parameters, the object instance is a first object instance, and the function call is a first function call, the method further comprising:

an act of accessing a second location expression of a second type;

an act of identifying a second location expression class of the multiple location expression classes that is used for resolving location expressions of the second type;

an act of using the second location expression to identify second one or more input parameters representing an environment for the second location expression to provide to a second object instance of the second location expression class;

an act of requesting a resolved location of the second location expression using the common method of the second object instance of the second identified location expression class; and an act of receiving the resolved location of the second location expression in response to the act of requesting a resolved location of the second location expression.

6. The computer program product in accordance with claim 5, wherein the first location expression comprises a variable location expression, and the second location expression comprises a lambda location expression.

7. The computer program product in accordance with claim 1, further comprising:

adding an additional location expression class to the multiple location expression classes, the additional location expression class also derive from the second abstract class.

8. The computer program product in accordance with claim 1, the method further comprising:

an act of providing multiple value expression classes that each derive from the first abstract base class such that each of the multiple value expression classes inherits the method for resolving a value expression into a value defined in the first abstract base class such that each value expression class implements a common method for resolving a value expression into a value, each value expression class used to resolve a respective distinct category of value expressions into a value in the continuation based runtime;

an act of accessing a value expression of a particular type;

an act of identifying a value expression class of the multiple value expression classes that is used for resolving value expressions of the particular type;

an act of using the value expression to identify one or more input parameters to representing an environment of the value expression to provide to an object instance of the identified value expression class;

an act of requesting a resolved value of the value expression using the common method of the object instance of the identified value expression class; and an act of receiving the resolved value of the value expression in response to the act of requesting.

9. A computer program product comprising one of more computer-readable storage devices having stored thereon computer-executable instructions that, when executed by a computing system capable of running a continuation based runtime, causes the computing system to perform a method for allowing the continuation based runtime to resolve value expressions of multiple value expression classes, the method comprising:

an act of providing a first abstract base class that defines a method for resolving a value expression into a value, and multiple value expression classes that each derive from the first abstract base class such that each of the multiple value expression classes inherits the method for resolving a value expression into a value defined in the first abstract base class such that each value expression class implements a common method for resolving a value expression into a value, and is used to resolve a respective distinct category of value expressions into a value in the continuation based runtime;

an act of an activity manager requesting an expression resolution module to resolve a value expression using the common method without determining the particular category of the value expression; and an act of the expression resolution module responding to the request by identifying the particular category of the value expression and invoking a value expression class that corresponds to the particular category to the value expression to generate and return a resolved value of the value expression.

10. The computer program product in accordance with claim 9, wherein the particular type of value expression comprises a literal value expression.

11. The computer program product in accordance with claim 9, wherein the particular type of value expression comprises a string format value expression.

12. The computer program product in accordance with claim 9, wherein the expression represents a property of an activity.

13. The computer program product in accordance with claim 9, wherein the expression binds an activity parameter to an environment.

14. A computer program product comprising one of more computer-readable storage devices having stored thereon computer-executable instructions that, when executed by a computing system capable of running a continuation based runtime, causes the computing system to perform a method for allowing the continuation based runtime to resolve location expressions of multiple location expression classes, the method comprising:

an act of providing:

a first abstract base class that defines a method for resolving a value expression into a value;

a second abstract class that derives from the first abstract base class and that defines a method for resolving a variable into a location;

multiple location expression classes that each derive from the second abstract class such that each of the multiple location expression classes inherits the method for resolving a value expression into a value defined in the first abstract base class and inherits the method for resolving a variable into a location from the second abstract class, such that each location expression class implements a common method for resolving a variable into a location, and is used to resolve a respective distinct category of location expressions into a location in a continuation based runtime;

an act of accessing a location expression of a particular type; and multiple value expression classes that each derive from the first abstract base class such that each of the multiple value expression classes inherits the method for resolving a value expression into a value defined in the first abstract base class such that each value expression class implements a common method for resolving a value expression into a value, each value expression class used to resolve a respective distinct category of value expressions into a value in the continuation based runtime;

an act of identifying a location expression class of the multiple location expression classes that is used for resolving location expressions of the particular type;

an act of using the location expression to identify one or more input parameters representing an environment for the location expression to provide to an object instance of the identified location expression class;

an act of requesting a resolved location of the location expression using the common method of the object instance of the identified location expression class; and an act of receiving the resolved location of the location expression in response to the act of requesting.

15. The computer program product in accordance with claim 14, wherein a first location class is a variable location class, and a second location class is a data source location class.

16. The computer program product in accordance with claim 14, further comprising:

an act of accessing a value expression of a particular type;

an act of identifying a value expression class of the multiple value expression classes that is used for resolving value expressions of the particular type;

an act of using the value expression to identify one or more input parameters to representing an environment of the value expression to provide to an object instance of the identified value expression class;

an act of requesting a resolved value of the value expression using the common method of the object instance of the identified value expression class; and an act of receiving the resolved value of the value expression in response to the act of requesting.

* * * * *